Dec. 16, 1958   J. L. VERDIER ET AL   2,864,984
ELECTRIC MOTOR CONTROL CIRCUIT

Filed Aug. 28, 1956

INVENTORS.
JOHN L. VERDIER
GEORGE O. VERDIER
WILLIS J. VERDIER
P. DOYLE VERDIER

United States Patent Office 2,864,984
Patented Dec. 16, 1958

2,864,984

ELECTRIC MOTOR CONTROL CIRCUIT

John L. Verdier, George O. Verdier, Willis J. Verdier, and Preston Doyle Verdier, Sidney, Ohio Application August 28, 1956, Serial No. 606,630

1 Claim. (Cl. 318—207)

This invention relates to electric motor control circuits, and particularly to an electric motor control circuit for instantly reversing the rotation of a split phase induction motor. The split phase motor herein referred to has but one running winding and one starting winding in the motor circuit.

The present invention utilizes a split phase motor circuit, which allows a reversing cycle to be started in the motor while the motor is rotating at normal speed, causing the instant reverse of rotation of the motor.

An object of the invention is to obtain instant reversing of the rotation of a split phase induction motor by reverse coupling one of the windings after the motor is operating at its normal speed, and momentarily energizing the starter winding, causing a reversed cycle of rotation in the motor circuit, reversing the rotation of the motor.

Another object of the invention is to provide instant reversing of the rotation of the standard split phase induction motor costing only half as much as special motors constructed to provide an instant reverse of rotation.

A further object of the invention is to provide automatic instant reversing of the operation of a split phase induction motor and driven machine for opening and closing doors, when during the operating cycle the door may be brought down on a person, object or vehicle which may be in the path of the moving door. In such instances this automatic instant reversing control will reverse the travel of the door and return it to its raised or open position.

These objects are illustrated and clarified by reference to the accompanying drawings wherein:

Figure 1 indicates a top plan view of a motor and driven machine;

Figure 1:
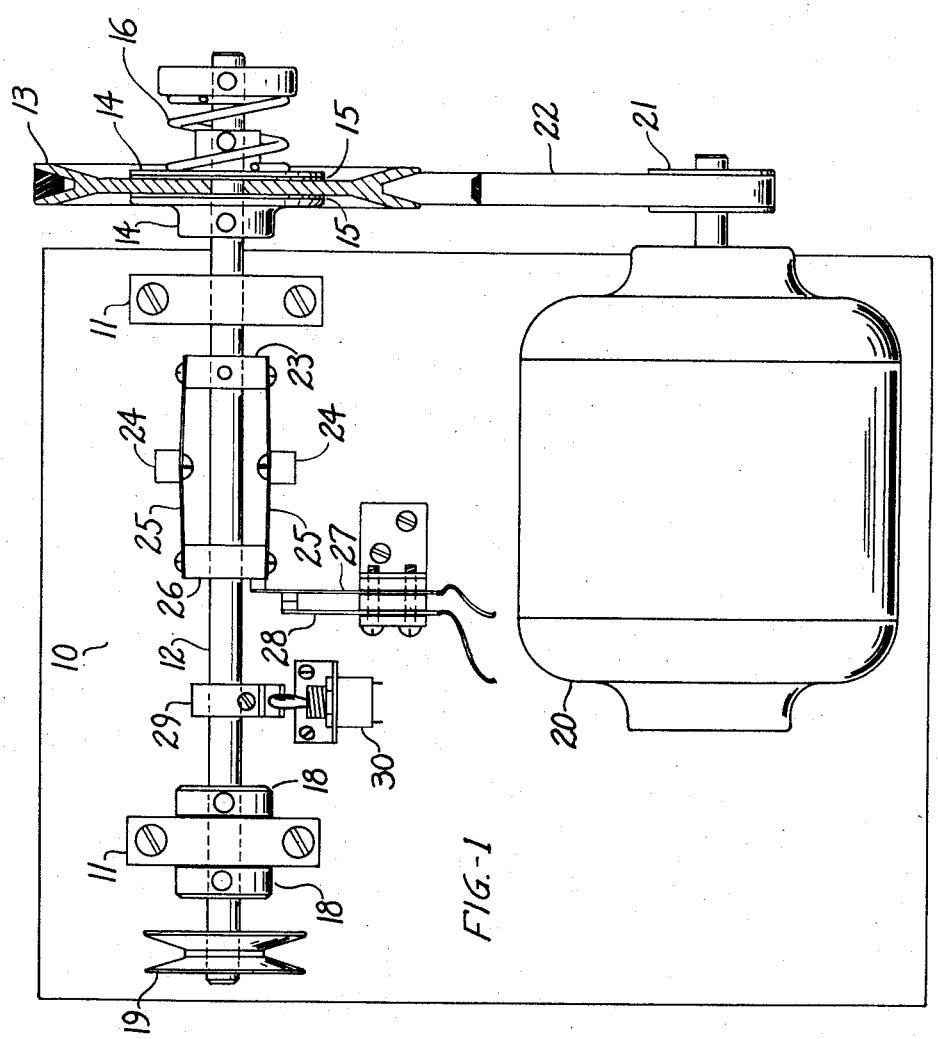

The reference number 10 indicates a base to which the mechanism is mounted. Number 11 is bearing blocks to support shaft 12 in a manner to permit said shaft to rotate. Pulley 13 is arranged for frictionally driving shaft 12 by virtue of the pressure plates 14 arranged on opposite sides of the pulley and pressed toward each other by a spring 16. Friction means such as the cork discs 15 are provided between the pressure pads 14 and the opposite faces of the pulley. By this arrangement the pulley 13 can slip should the shaft 12 become loaded beyond a predetermined allowable limit. Thrust collars 18 are secured to said shaft on opposite sides of one of the bearing blocks 11 to prevent said shaft from traveling horizontally in said bearings. Other machinery to be driven is connected to pulley 19. A reversible split phase motor 20 mounted on base 10 provided with motor pulley 21 which drives the clutch pulley 13 by means of an endless belt 22.

Figure 2:
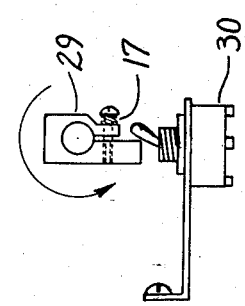
Figure 2 shows end view of lever arm 29 and reversing switch 30.
Figure 3:
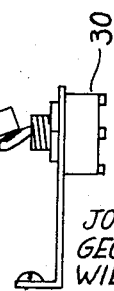
Figure 3 shows an end view of lever arm 29 and reversing switch 30.

A governor mounted on shaft 12 is herein described by the following numbers:

Collar 23 is secured to shaft 12. Collar 26 is allowed to move horizontally on shaft 12. Springs 25 have weights 24 secured to said springs. Said springs are secured to collars 23 and 26 radial and on opposite sides so as to balance when the governor is rotated. The operation of the governor is accomplished when the said shaft is rotated in a clockwise or counterclockwise direction. The centrifugal force exerted against the springs 25 by weights 24 allows said weights to rotate in a larger radius, bending the said springs outwardly from the said shaft in the midsection, this causes collar 26 to move horizontally on said shaft toward collar 23. Contact arm 27 is of spring material with its tension exerted against collar 26 of the governor. When the motor is started the aforementioned governor operates to allow contact arm 27 to move away from contact arm 28 which opens a circuit. A frictionally driven lever 29 on shaft 12 operates a double pole double throw current reversing switch 30. Lever 29 is frictionally driven by a clamping action on shaft 12 supplied by the tension of spring 17 (Fig. 2). When shaft 12 is rotated clockwise, lever arm 29 rotates with said shaft until said lever arm comes in contact with the toggle of switch 30 having sufficient friction driving pressure to throw toggle of said switch to the left as shown in Fig. 3.

When said shaft is rotated counterclockwise, lever arm 29 rotates with said shaft until said lever arm comes in contact with the toggle of switch 30 having sufficient friction driving pressure to throw the toggle of said switch to the right as shown in Fig. 2.

Figure 4:
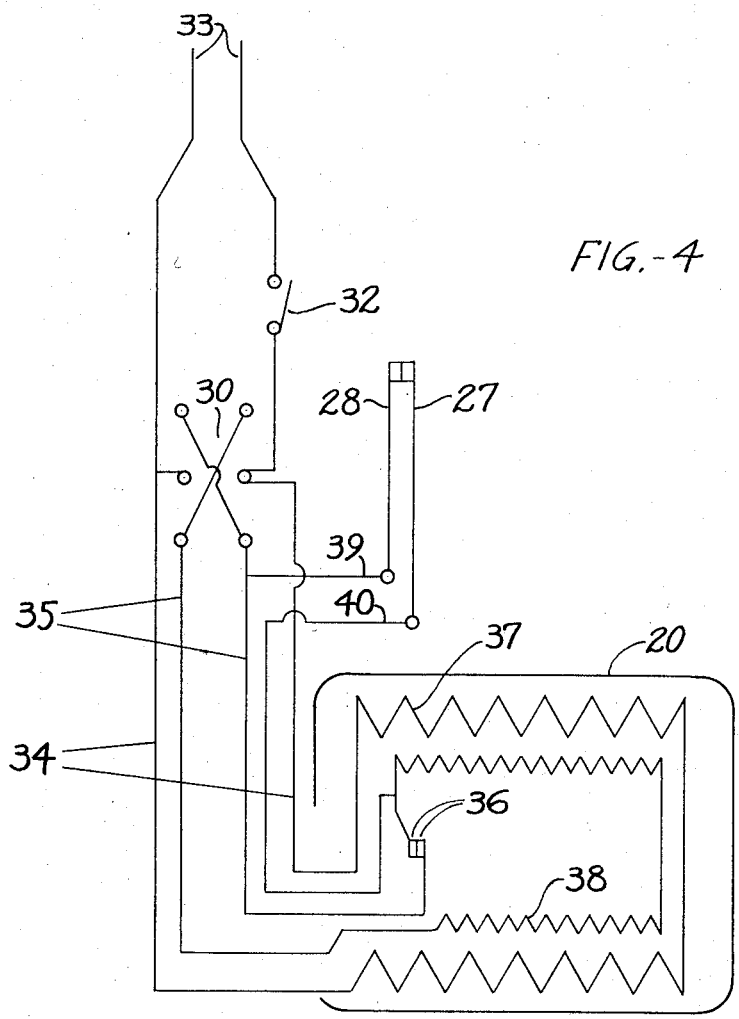
Figure 4 is a diagram of the circuit used.

Figure 4 of the drawings shows a layout of the electrical system which is employed for energizing and controlling the electric motor hereinbefore referred to. This includes a pair of wires 33, coming from a source of power of ordinary intensity with switch 32 to control the circuit. Wires 33 continue to the reversing switch 30 and through wires 34 to the running winding 37 of the motor 20. Wires 33 also furnish power through the reversing switch 30 and continues through wires 35 through starter winding switch 36 and to the starter winding 38. This completes the circuit for the motor to be rotated in either direction desired by operating the reversing switch after the motor 20 has been permitted to stop by opening switch 32. Wire 40 bypasses starter winding switch 36 and is connected to contact arm 27 which is operated by said governor. Wire 39 brings starter winding current to contact arm 28. This arrangement of wiring, parallels contacts on arms 27 and 28 and contacts 36 of the motor, allowing either pair of contacts to have control of the starter winding.

*Operation*

Referring to the drawings, with switch 32 in open position and the mechanism is stopped, when switch 32 is closed, electrical energy from the power source passes through wires 33 to the reversing switch 30 which is connected to the motor 20. Starting contacts on arms 27 and 28 are connected in parallel to contacts 36 of the motor 20 (Fig. 4). Contacts 36 are opened by a governor built in the motor which is used in an induction motor to open the starter winding circuit after the motor has started. With said motor rotating shaft 12 by means aforementioned, said governor on shaft 12 operates to a position to open the contacts on arms 27 and 28. As said shaft rotates, lever arm 29 rotates with said shaft in a clockwise direction approximately one revolution and throws the toggle on reversing switch 30 to the left (Fig. 3) after contacts on arms 27 and 28 and contacts 36 have opened. As shaft 12 continues to rotate, lever arm 29 remains in this position as shaft 12 is allowed to rotate in lever arm 29 in the same direction. Should pulley 19 become loaded beyond a predetermined allowable limit, friction clutch pulley 13 can slip on shaft 12. As the speed of said governor on shaft 12 is reduced, the governor acts to close contacts on arms 27 and 28 allowing the electrical energy to flow through contacts on arms 27 and 28 to the starting winding 38 of the motor and the reversing switch 30, instantly reversing the rotation of the motor and driven part. As the motor operates in the reverse direction, shaft 12 is reversed, rotating lever arm 29 in a counterclockwise direction approximately one revolution, throwing the toggle on reversing switch 30 to the right (Fig. 2) after said governor has allowed contacts on arms 27 and 28 to open the starting winding circuit and contacts 36 are opened on the same circuit. When pulley 19 is loaded beyond a predetermined allowable limit, friction pulley 13 slips on shaft 12. As the said governor's speed is reduced, said governor acts to close contacts on arms 27 and 28. This allows the electrical energy to flow through contacts on arms 27 and 28 to the starting winding of the motor and reversing switch 30, instantly reversing the rotation of the motor and driven part.

A further modification of the invention in its use with a door opening and closing machine lies in the provision of arranging contacts on arms 27 and 28 in such a manner in which said contacts are actuated by a predetermined amount of torque built up between the motor and the driven door, reversing the travel of said motor and driven door.

We are aware that reverse coupling the starter winding of a split phase induction motor either direction of rotation of said motor can be obtained and no claim is made hereon.

However, since numerous modifications and changes will readily occur to those skilled in the art after a consideration of the foregoing specification and the accompanying drawings, it is not desired to limit the invention to the exact construction shown and described, but all suitable modifications and equivalents may be resorted to falling within the scope of the appended claim.

What we claim as new and desire to secure by Letters Patent is:

In combination with a motor and driven machine of the type described, an adjustable slippable clutch allowing said motor to rotate at normal speed when said driven machine is overloaded and falls below its normal speed, a current reversing switch actuated by each change of rotation of said driven machine, a pair of contacts actuated by said driven machine and said contacts actuated to closed position when rotation of driven machine falls below its normal speed, said contacts allowing electrical energy to flow through said reversing switch to the starting winding of said motor, instantly reversing the rotation of said motor and driven machine.

References Cited in the file of this patent

UNITED STATES PATENTS 2,473,244    Fuller _____ June 14, 1949